United States Patent
Samuel et al.

(10) Patent No.: US 7,878,246 B2
(45) Date of Patent: Feb. 1, 2011

(54) METHODS OF PERFORATION USING VISCOELASTIC SURFACTANT FLUIDS AND ASSOCIATED COMPOSITIONS

(75) Inventors: Mathew M. Samuel, Sugar Land, TX (US); Yerik Balabatyrov, Kostanai (KZ); Frank F. Chang, Al-Khobar (SA); Martin Griffith, Trincity (TT); Liz Morris, Aberdeen (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 135 days.

(21) Appl. No.: 12/323,675

(22) Filed: Nov. 26, 2008

(65) Prior Publication Data

US 2009/0139766 A1    Jun. 4, 2009

Related U.S. Application Data

(60) Provisional application No. 60/991,805, filed on Dec. 3, 2007.

(51) Int. Cl.
*E21B 43/25* (2006.01)
(52) U.S. Cl. .............. 166/297; 166/305.1; 166/312
(58) Field of Classification Search ............ 166/297, 166/305.1, 312
See application file for complete search history.

(56) References Cited

U.S. PATENT DOCUMENTS

| 4,439,333 A | * | 3/1984 | House et al. | 507/216 |
| 4,501,330 A | * | 2/1985 | Garcia | 166/297 |
| 4,662,448 A | | 5/1987 | Ashford et al. | |
| 5,329,998 A | | 7/1994 | King et al. | |
| 5,392,855 A | | 2/1995 | Bernardi, Jr. et al. | |

(Continued)

FOREIGN PATENT DOCUMENTS

EP    1128021    4/2007

(Continued)

*Primary Examiner*—Giovanna C. Wright
(74) *Attorney, Agent, or Firm*—Martin Rzaniak; David Cate; Robin Nava (57) ABSTRACT

The invention provides a method for perforating a well with a perforating fluid comprising a viscoelastic surfactant that essentially stops fluid leak-off after perforation in an overbalanced condition. Another aspect of the invention provides the perforating fluid in itself. The well has a wellbore defined by a generally cylindrical casing in at least a portion of the wellbore (i.e., the wellbore is cased, although it is not necessary cased in its entire length). The wellbore passes through a subterranean formation that comprises hydrocarbon formation fluids (such as oil and/or gas), at least in certain strata. The method comprises placing a perforating device in a wellbore which includes at least one explosive perforating charge that can be detonated in order to perforate the casing and allow the formation fluids to enter the wellbore. The casing is located between the subterranean formation and the perforating device. A perforating fluid including at least one viscoelastic surfactant is placed in the wellbore between the perforating device and the casing, in at least a portion of the wellbore. In other words, the perforating fluid is present in the wellbore adjacent to the perforating device. The explosive charge(s) in the perforating device is detonated, such that the perforating device forms at least one perforation in the casing that permits the flow of hydrocarbon formation fluids from the subterranean formation into the wellbore. As a result of the detonation, at least a portion of the perforating fluid is put in communication with the subterranean formation.

12 Claims, 4 Drawing Sheets

U.S. PATENT DOCUMENTS

| | | |
|---|---|---|
| 5,421,411 A | 6/1995 | Sydansk |
| 5,547,025 A | 8/1996 | Ahmed et al. |
| 5,582,250 A | 12/1996 | Constien |
| 5,981,447 A | 11/1999 | Chang et al. |
| 6,140,277 A | 10/2000 | Tibbles et al. |
| 6,325,149 B1 | 12/2001 | Dobson, Jr. et al. |
| 6,342,467 B1 | 1/2002 | Chang et al. |
| 6,387,986 B1 | 5/2002 | Moradi-Araghi et al. |
| 6,399,546 B1 | 6/2002 | Chang et al. |
| 6,450,260 B1 | 9/2002 | James et al. |
| 6,489,270 B1 | 12/2002 | Vollmer et al. |
| 7,036,594 B2 * | 5/2006 | Walton et al. ............... 166/297 |
| 7,148,185 B2 | 12/2006 | Fu et al. |
| 7,182,138 B2 | 2/2007 | Behrmann et al. |
| 7,261,159 B2 | 8/2007 | Kneisl |
| 7,291,651 B2 | 11/2007 | Chen et al. |
| 2003/0236174 A1 * | 12/2003 | Fu et al. ..................... 507/200 |
| 2004/0099418 A1 * | 5/2004 | Behrmann et al. .......... 166/312 |
| 2006/0000609 A1 | 1/2006 | Cavazzoli et al. |
| 2006/0278392 A1 | 12/2006 | Kneisl |

FOREIGN PATENT DOCUMENTS

| | | |
|---|---|---|
| GB | 2352259 | 1/2001 |
| GB | 2408057 | 5/2005 |
| WO | 9524452 | 9/1995 |
| WO | 2005100503 | 10/2005 |

* cited by examiner

METHODS OF PERFORATION USING VISCOELASTIC SURFACTANT FLUIDS AND ASSOCIATED COMPOSITIONS

CROSS-REFERENCE TO RELATED APPLICATION

This application is entitled to the benefit of, and claims priority to, provisional patent application Ser. No. 60/991,805 filed Dec. 3, 2007, the entire disclosure of which is incorporated herein by reference.

BACKGROUND OF THE INVENTION

This invention relates generally to the art of making and using oilfield treatment fluids viscosified with surfactants that gel in aqueous systems. More particularly it relates to perforating fluids and methods of perforating in a well from which oil and/or gas can be produced. Most particularly it relates to perforating fluids and methods of perforating applying to a well with casing and/or having high density brines.

The statements in this section merely provide background information related to the present disclosure and may not constitute prior art.

In order to produce hydrocarbon fluids from subterranean formations, a borehole is drilled from the surface down into the desired formations. Typically, casing is placed in the borehole, thereby defining a hollow wellbore. In order for the hydrocarbon fluids to flow from the surrounding formations into the wellbore and up to the surface, it is necessary to perforate the casing. This is typically done using a perforating gun, a downhole tool that detonates explosive charges at selected locations in order to form holes in the casing.

Because the fluids in the formation are under pressure, a choice must be made whether to perforate the well with the bottom-hole pressure in the wellbore lower or higher than the formation pressure. The former condition is referred to as "underbalanced" and the latter condition is referred to as "overbalanced".

It has been common to perforate the casing of a well in an underbalanced condition to minimized impairment to the formation permeability. Placing a perforating fluid between the formation and the hollow wellbore that prevents leakoff in an overbalanced condition allows the well to be perforated but restricted from producing and therefore under control. An operator can then safely complete the perforating and subsequent well completion operations without loss of fluids into the formation and without movement of fluids from the formation into the wellbore. This perforating fluid now allows high pressure reservoirs where an underbalance condition is easy to achieve as well as low pressure reservoirs where it is not possible to achieve an under-balanced condition can be perforated overbalanced.

Experience has shown that different wellbore fluids can have significant effects on production rates. For example, perforating with brine in the wellbore usually results in two-phase (oil and water) flow in the formation pores. This condition is known to deleteriously affect production rates. It is also possible to perforate with an oil-based mud in the wellbore. This eliminates the two-phase flow in the formation pores, but can results in plugging some pores with the solid (clay) portion of the mud.

Viscous fluids play an important role in oilfield service applications ranging from fracturing fluids, gravel pack fluids, drilling fluids, cleanout fluids, acid diverting reagents, fracture fluid diverting agents and many more. Nearly all of the traditional fluids for these applications are polymer based and have several intrinsic drawbacks due to their polymeric nature, such as irreversible formation damage and high friction pressure. A new technology based on viscoelastic surfactant (VES) fluids has several distinctive advantages over polymer-based fluids. VES based fluids are excellent particle suspension media; which form entangled micelle structures. Unlike polymer fluids, when the VES systems break they form solids-free fluids, minimizing damage wherever they are used. However, many VES fluids are very sensitive towards high brine concentrations, especially heavy brines, often not gelling at all. Therefore their use as fluids for gravel pack applications, drill-in or completion fluids, especially for deep wells, and all other applications demanding heavy fluids to balance the well pressure is still very limited. In order to overcome these limitations, new developments of brine insensitive fluids are necessary.

The fluids of embodiments of the present invention are the VES fluids that can best meet the density and stability requirements. VES fluid systems are advantageously used for coiled tubing cleanout applications, in particular in horizontal or inclined wellbores, because VES fluids have superior drag reduction properties (that is, low friction pressures); they can be foamed; they generally undergo micelle disruptive shear thinning at high shear rates (high flow rates and/or great turbulence in the tubing); the very low viscosity fluid that has undergone disruptive shear thinning can enter the sand mass and pick the sand up easily; and since they recover viscosity quickly, the sand will remain suspended as it is moved back up the wellbore.

Further, such fluids have been generally used as completion fluids, fracturing fluids and the like, while conventional materials such as mineral acids, organic acids and chelation agents have been employed as perforating fluids. Such fluids however, when used alone, may introduce damage into the formation and/or be subject to dilution or precipitate due to incompatibility with to the high-density brines. Further, such fluids when used alone may not be capable of effectively removing perforating debris from the wellbore.

There is a need for improved methods of perforating well that reduce or eliminate at least some of the above-described problems.

It has now been discovered that a certain viscoelastic surfactants can be used as a perforating fluid to stop fluid leak-off, even with high density brines.

It has now been discovered that certain viscoelastic surfactants can be used to stop fluid leak-off in scenarios where the well has been perforated prior to the introduction of the viscoelastic surfactants.

SUMMARY OF THE INVENTION

According to a first aspect of the invention, a method for perforating a well made of a wellbore in a formation is disclosed the method comprises the steps of: placing a perforating device comprising at least one explosive perforating charge in the wellbore; placing a perforating fluid comprising at least one viscoelastic surfactant in the wellbore between the perforating device and the formation; detonating the perforating device and allowing formation fluids to enter the wellbore; wherein as a result of the detonation, communication is established between the wellbore and the formation, and at least a portion of the perforating fluid is put in communication with the formation. The perforating fluid can be forced into the formation thanks to the detonating charge. The well has a wellbore defined by a generally cylindrical casing in at least a portion of the wellbore (i.e., the wellbore is cased, although it is not necessary cased in its entire length). Preferably, the wellbore passes through a subterranean formation that comprises hydrocarbon formation fluids (such as oil and/or gas), at least in certain strata. Other application in geothermal wells, $CO_2$ injection or storage wells, as well as, water wells is possible. The method comprises placing a perforating device in a wellbore. Such perforating device comprises at least one explosive perforating charge that can be detonated in order to perforate advantageously the casing and allow the formation fluids to enter the wellbore. The casing is thus located between the subterranean formation and the perforating device.

The perforating fluid comprising at least one viscoelastic surfactant is placed in the wellbore between the perforating device and the casing, at least for a portion of the wellbore. In other words, the perforating fluid is present in the wellbore adjacent to the perforating device. The at least one explosive charge in the perforating device is detonated, such that the perforating device forms at least one perforation in the casing that permits the flow of hydrocarbon formation fluids from the subterranean formation into the wellbore. As a result of the detonation, at least a portion of the perforating fluid is forced into the subterranean formation. The perforating fluid can be placed into the wellbore prior to or after placement of the perforating device.

Advantageously, the perforating fluid comprising at least one viscoelastic surfactant is placed in the wellbore with existing perforations prior to re-perforating the casing. The perforating fluid is placed prior to placing perforating device. The perforating fluid is placed between the perforating device and the casing, at least for a portion of the wellbore where at least a portion of the perforating fluid is forced into the subterranean formation as the wellbore becomes overbalanced.

The method can further comprise the step of allowing the perforating fluid to slowdown or stop fluid leak-off from the formation. Effectively, thanks to the viscoelastic surfactant properties and the fact that the perforating fluid is forced into the holes from the subterranean formation made by the perforating device fluid leak-off from the well can be stopped.

The method can advantageously be used when the wellbore further contains in at least a portion thereof saline water or brine with weight concentration of salt equal or above 0.96 kg/L (8 ppg); or brine with weight concentration of salt equal or above 12.5 kg/L (104 ppg). Salt can be sodium chloride, potassium chloride, calcium chloride, sodium bromide, calcium bromide or the like.

The method can also advantageously be used when the wellbore further contains in at least a portion thereof temperature equal or above 60degC; or equal or above 100degC.

Alternatively, the method can comprise the step of an additional treatment selected from the group consisting of: stimulation by acidizing, killing the well, scale treatment, water jetting treatment, perforating treatment as disclosed previously and a combination thereof.

The method disclosed herewith can be used with the perforating fluid as disclosed below. Placing any component downhole may be made advantageously by pumping it from surface, however other techniques made be used as reverse pumping, placing it downhole from a downhole tool, releasing it in situ downhole from another treatment fluid or generating it in situ downhole. Perforation is disclosed by means of using at least one explosive perforating charge, however other equivalent techniques made be used and the applicants do not want to restrain claims to this only one technique. Current perforating fluid is compatible with equivalent techniques.

According to a second aspect of the invention, a perforating fluid for use in a well within a subterranean formation penetrated by a wellbore is disclosed. The fluid comprises at least one viscoelastic surfactant and wherein said fluid is able to remain stable in saline water or brine with weight concentration of salt equal or above 0.96 kg/L (8 ppg); or brine with weight concentration of salt equal or above 1.2 kg/L (10 ppg).

In another embodiment, the perforating fluid is able to remain stable at temperature equal or above 60degC. Still in another embodiment, the perforating fluid is able to remain stable at temperature equal or above 100degC.

In one embodiment, the perforating fluid is a solids free fluid.

In one embodiment, the perforating fluid comprises at least one zwitterionic viscoelastic surfactant. In another embodiment, the perforating fluid comprises at least one betaine viscoelastic surfactant. Betaines are good for multivalent brine (eg. $CaCl_2$) and not stable with high concentrations of monovalent ions (Cs Formate). Quaternary ammonium cations are stable with mono valent (lower concentrations). Mixtures of these can also be used to modify the compatibility with the brine.

In a second embodiment, the perforating fluid comprises at least one cationic surfactant.

The fluid can further comprise an internal breaker.

In a further embodiment, the perforating fluid comprises at least one viscoelastic surfactant and at least one additional formation treatment agent such as a mineral acid, organic acid, chelating agents, alcohols, amines, mutual solvents, co-surfactant, an enzyme containing material, defoamers, wettability modifiers, permeability modifiers, nanoparticles, nanotubes, stabilizers, external breakers, or any type of polymer.

In another embodiment, the perforating fluid also contains fibers or particles of self-dissolving chemicals, e.g., polylactic acid (PLA) or polyglycolic acid (PGA) (or another type of chemistry) and/or acid-dissolving particles that are particularly sized e.g. $Ca(CO_3)_2$ to the VES. Use of such materials will help to control leak off to reservoirs containing natural fractures when perforating.

In one embodiment, the perforating fluid is an oil based perforating fluid comprising at least one viscoelastic surfactant.

In a second embodiment, the perforating fluid is a water based perforating fluid comprising at least one viscoelastic surfactant.

In a third embodiment, the perforating fluid is an emulsion oil/water or water/oil or an emulsion made of water and oil able to become an invert emulsion under specific conditions chemical or mechanic trigger.

In one embodiment, the perforating fluid further comprises insoluble solid particles or aggregates, fibers, flakes, platelets or mixtures. In a second embodiment, the perforating fluid further comprises partially insoluble solid particles or aggregates, fibers, flakes, platelets or mixtures. All components disclosed can be insoluble in water, oil, acid, saline water or brine.

In a third embodiment, the perforating fluid further comprises soluble solid particles or aggregates, fibers, flakes, platelets or mixtures. In a fourth embodiment, the perforating fluid further comprises partially soluble solid particles or aggregates, fibers, flakes, platelets or mixtures. All components disclosed can be soluble in water, oil, acid, saline water or brine. The components can also be insoluble in water, oil, acid, saline water or brine first and become soluble in water, oil, acid, saline water or brine after with a mechanical or chemical trigger. The mechanical trigger can be for example a shear threshold, the component being encapsulated. The chemical trigger can be an additional chemical component added which will dissolve the components after a certain period of time. Combination of properties can also be possible, e.g. a component can also be insoluble in water, and soluble in oil first and become soluble in brine and insoluble in oil after under downhole conditions.

In one embodiment, the perforating fluid is foamed and foam is made by nitrogen, carbon dioxide or air.

In a second embodiment, the perforating fluid further comprises an element able to create nitrogen, carbon dioxide or air after chemical reaction or mechanical stimulation in situ. In this case, most generally the perforating fluid at the surface is unfoamed and when place downhole the element will help to release nitrogen, carbon dioxide or air within the perforating fluid to foam it.

According to a last aspect of the invention, use of the perforating fluid disclosed herewith for perforating a wellbore in a formation is disclosed.

DETAILED DESCRIPTION OF THE INVENTION

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

Certain surfactant fluid gels, for example erucylamidopropyl betaine surfactant fluid gels, can be made to be surprisingly stable in and tolerant of high salinity and high density (heavy) brines (defined as brines having a densities above about 1.5 kg/L (about 12.5 ppg). Many surfactants that form VES gels in aqueous systems will form gels only over a certain, often narrow, electrolyte concentration range; with too little salt, or too much, they will not form stable gels, and especially at high temperatures and in dense brines they will phase separate. Some surfactants are compatible with heavy brines, but not at high temperatures. For example, aqueous gels made from cationic surfactants, such as those made from 3% of a mixture of N,N'-bis-(2-hydroxyethyl)-N-methyl-9-octadecen-1-ammonium chloride, $C_{12}$-$C_{18}$ alkyl bis-(2-hydroxyethyl) ammonium chlorides, and $C_{20}$-$C_{22}$ alkyl bis-(2-hydroxyethyl) ammonium chlorides are compatible with heavy calcium brines, but only up to a temperature of about 71° C. (160° F.); when further mixed with 3% (Z)-13 docosenyl-N-N-bis (2-hydroxyethyl) methyl ammonium chloride, they form aqueous gels stable up to about 93° C. (200° F.) in heavy calcium brines.

However, several zwitterionic surfactants have been found to be particularly useful in forming aqueous gels of exceptional thermal stability even in high salinity and heavy brines. Their compatibility with heavy brines at unexpectedly high temperatures is an important feature of embodiments of the present invention. The perforating fluid of the present invention is stable at high temperatures (in excess of 177° C. (350° F.)). In some embodiments of the invention for instance, the fluid is stable at 149° C. (300° F.) for extended periods >72 hours and for >36 hours at 160° C. (320° F.). The fluid is compatible with oilfield heavy brines and does not require the addition of further fluid loss materials such as starch, sized salts, carbonate chips, mica or other particulates.

In particular embodiments, the present invention is based on adding an effective amount of a surfactant from a particular family of zwitterionic viscoelastic surfactants to a well fluid. In a preferred aspect of the invention, the viscoelastic surfactant comprises at least one compound selected from the family of compounds described by the general structure shown below:

Surfactants that are suitable for embodiments of the present invention includes those in which the carbon chains $R_1$, $R_2$, $R_3$, $R_4$ and $R_5$ are carbon chains, saturated or unsaturated, straight, branched or cyclic including aromatic groups, and $R_1$ contains 16-26 carbon atoms (not counting the carbonyl carbon atom), $R_2$ contains 2-10 carbon atoms, $R_3$, $R_4$ and $R_5$ contains 1-6 carbon atoms.

In a preferred aspect of the invention, R2 and R5 are straight saturated chains and most preferably, the compounds are from the family of betaines. Two preferred examples of viscoelastic surfactants from the family of betaines are BET-O and BET-E. The surfactant in BET-O-30 is shown below. It is manufactured by Rhodia, Inc. Cranbury, N.J., U.S.A. It contains an oleyl acid amide group (including a $C_{17}H_{33}$ alkene tail group) and contains about 30% active surfactant; the remainder is substantially water, sodium chloride, and a winterizing agent. An analogous material, BET-E-40, is also available from Rhodia and contains a erucic acid amide group (including a $C_{21}H_{41}$ alkene tail group) and is about 40% active ingredient, with the remainder substantially water, sodium chloride, and isopropanol.

BET-O-30 (when n = 3 and p = 1)

The surfactant in BET-E-40 is also shown below.

BET-E-40 (when n = 3 and p = 1)

The viscoelastic surfactant is typically added in a quantity such that the above viscoelastic surfactant blend comprises about 3% to about 30 % by volume of the perforating fluid (bearing in mind that the surfactant itself is added as a solution). Therefore, to obtain a fluid comprising 10% by volume of viscoelastic surfactant blend, 10 ml of a solution of surfactant blend must be added to 100 ml of base fluid (water/brine).

Betaines will gel aqueous solutions without the need for added salts, as is necessary for many other surfactants that form VES fluids. Preferred embodiments of the present invention use BET-E-40. Experiments have shown that addition of BET-E-40 improves the stability of BET-E-30 in heavy brines. Although experiments have not been performed, it is believed that mixtures of BET-E-40 with other surfactants (as with BET-O-30) will also form stable aqueous gels, in heavy brines, that are more stable than gels made with the other surfactants but without the addition of BET-E-40. Such mixtures are within the scope of embodiments of the invention.

Other betaines that are suitable include those in which the alkene side chain (tail group) contains 19-23 carbon atom (not counting the carbonyl carbon atom) which may be branched or straight chained and which may be saturated or unsaturated, n=2-10, and p=1-5, and mixtures of these compounds. More preferred betaines are those in which the alkene side chain contains 17-21 carbon atoms (not counting the carbonyl carbon atom) which may be branched or straight chained and which may be saturated or unsaturated, n=3-5, and p=1-3, and mixtures of these compounds.

The base fluid may be fresh water or an aqueous solution comprising mono, di or trivalent metal salts, ammonium or mixtures of these. For some applications, the base fluid may further comprises an alcohol such as methanol, ethanol, propanol or a polyalcohol such a glycol or polyglycols or mixture thereof.

Preferred ratio ranges between about 5% and about 20% by volume and most preferred ratio is between 8 to 15% by volume.

According to U.S. Pat. No. 6,258,859, cosurfactants may be useful in extending the brine tolerance, and to increase the gel strength and to reduce the shear sensitivity of the VES-gel fluid, especially for BET-O. An example given in the above patent is sodium dodecylbenzenesulfonate (SDBS) as shown below. The ability of cosurfactants to increase the gel stability of other main surfactants depends upon the cosurfactant having the appropriate geometry (including the appropriate tail group length) and appropriate affinity for the main surfactant head group. The appropriate geometry is essentially independent of the presence of other electrolytes. Affinity for the main head group can be affected by electrolytes, their concentration and pH. Other suitable cosurfactants for BET-O-30 are certain chelating agents such as trisodium hydroxyethylethylenediamine-triacetate.

In certain embodiments, a surfactant may also be blended with a cosurfactant. Suitable cosurfactants include the class of benzene sulfonates that shown above in which x=5-15; preferred cosurfactants are those having x=8-12. Cosurfactants are more commonly used with BET-O-30 and are generally not needed with BET-E-40, but any of the suitable betaines can be used with or without cosurfactants.

In one embodiment, erucylamidopropyl betaine is used as the surfactant. An "effective" amount as used herein means an amount of viscoelastic surfactant that is able to raise the viscosity and/or temperature stability of a well fluid to a level required by the specific application. It is believed that the combination of viscoelastic surfactant in the presence of brine can result in micelle formation and the entanglement of micelles can lead to increased viscosity for the fluid. Other patent or application have noted the presence of micelles in well fluids, such as those disclosed for example by U.S. Pat. No. 5,964,295, assigned to the assignee of the present disclosure.

In another embodiment, the viscoelastic surfactant is a quaternary ammonium chlorides, including but not limited to, dimethyl didodecenyl ammonium chloride, (Z)-13 docosenyl-N-N-bis (2-Hydroxyethyl) methyl ammonium chloride, cetyl triammonium bromide, cetyl triammonium chloride, and the like.

Although the uses are described in terms of producing wells for oil and/or gas, the fluids and methods may also be used for injection wells (such as for enhanced recovery or for storage) or for production wells for other fluids such as carbon dioxide or water.

This perforating fluid can also suspend the perforating debris resulting in cleaner perforations. When perforating in this non-damaging fluid the very high low shear viscosity exhibited by the fluid can eliminate or substantially reduce the heavy leakoff of brine and resulting damage. Further, this system can be mixed with reactive fluids (mineral acid, organic acid, chelating agents etc) without any loss in viscosity and can result in further stimulation of the formation close to the perforation. Thus, the perforating fluids of the invention can result in a clean perforation, reduce leakoff of fluid and its attendant damage, provide wellbore cleanup and stimulate the well all with one treatment.

The high density brines described herein are usually made from salts of divalent metals such as calcium and zinc, although brines made from potassium, ammonium, sodium, cesium and the like may also be used. Organic cations such as ammonium and tetramethylammonium may also be used. Typical inorganic anions for high density brines include chloride and bromide, although organic anions such as formate and acetate may also be used. Some of the salts made from some combinations of these anions and cations may not impart sufficient density and may have to be used in combinations with other anions and cations that give higher density brines. Such mixtures are within the scope of embodiments of the invention, as are brines containing any other salts provided that none of them disrupts the structures giving rise to the surfactant gels in high density brines to the point where they no longer give sufficiently stable high viscosity gels at the temperatures at which they are needed. It should be understood that when a fluid is described as being made by adding a salt, this may mean by combining anhydrous or hydrated salts with a fluid or by combining a brine (such as a concentrated or saturated brine) with a fluid, and the combining may be done in any order.

Similarly, other additives such as alcohols, polymeric materials, other surfactants, chelating agents and the like may be included, again provided that none of them disrupts the structures giving rise to the surfactant gels in high density brines to the point where they no longer give stable high viscosity gels at the temperatures at which they are needed. As-received surfactants often include lower alcohols (like propanols) and/or glycols to reduce their viscosities and/or to lower their freezing points to make them easier to handle and use. In embodiments of the present invention, addition of alcohols is intended to mean in addition to alcohols already present in the as-received material.

Some alcohols are known to stabilize aqueous BET gels. U.S. Pat. No. 6,258,859 describes addition of alcohols to betaines. These alcohols are described as medium to long chain alcohols (preferably alkanols), preferably having five to ten carbon atoms. We have found that methanol, ethanol, isopropanol, and mixtures of these alcohols stabilize fluid embodiments of the invention. The preferred alcohol is methanol. The alcohol if added, is added in an amount up to about 10 volume percent, preferably in an amount of about 1 to about 6 volume percent.

In a typical formulation, sufficient as-received surfactant mixture is used to form a fluid that contains about 0.2 to about 20% active surfactant, with a preferred concentration range of from about 1 to about 12% active surfactant. Describing the procedure in terms of oilfield use, the surfactant, water and salt may be blended in any order either in the field or at a separate location. Alternatively, some of the components can be premixed on site or at a separate location and then one or more other component(s) may be added later. The fluids may be batch mixed or mixed on the fly. Other additives required for typical oilfield treatments can normally be included, provided that none of them disrupts the structures giving rise to the surfactant gels in high-density brines to the point where they no longer give sufficiently stable high viscosity gels at the temperatures at which they are needed. The fluid can be pumped as a liquid, energized, or foamed, for example with nitrogen. Although no experiments have been performed, it is believed that carbon dioxide can also be used. It is believed that air can also be used provided that oxidative degradation does not occur or is controlled.

Another advantage of the fluids and methods of embodiments of the invention is that the aqueous gelled fluids are shear thinning but not shear degrading. Shear thinning in this context is used with the conventional meaning for a viscous fluid: as the shear rate is increased, the viscosity decreases. This type of shear thinning is reversible; that is, the viscosity increases again if the shear rate is decreased. Shear thinning is beneficial because this behavior reduces the hydraulic horsepower required during pumping. Shear degradation is a deficiency of fluids thickened with polymers, especially crosslinked polymers; their chemical bonds are permanently broken and they do not recover their viscosity (reheal) when the shear rate is reduced or shearing is stopped.

There is a second type of shear thinning undergone by surfactant-based aqueous gels (but not crosslinked polymer-based aqueous gels) whose viscosity is caused by a temporary structure such as a micelle. Although we do not intend to be limited by theory, we believe that this second type of shear thinning is caused by temporary disruption of the structure, so we will call it "disruptive shear thinning". Disruptive shear thinning is characterized by an almost complete loss of viscosity such that above a certain shear rate the viscosity of the fluid is close to that of water. Whether or not VES fluids undergo disruptive shear thinning is primarily a function of the shear rate, the nature and concentration of the surfactant, the temperature, the nature and concentration of co-surfactants and other additives (such as alcohols) if they are present, and the nature and concentration of electrolytes if they are present. Disruptive shear thinning is reversible; when the shear rate is reduced, the structure reforms and the viscosity returns. The disruption and recovery take time and each can be retarded or accelerated by additives.

Only conventional shear thinning was observed for any of the fluids at the shear rates of any of the examples given here; disruptive shear thinning, if it were to occur, would be observed only at higher shear rates that might be encountered during pumping down wellbores, especially at restrictions in equipment.

In oilfield applications disruptive shear thinning may be desirable or undesirable. For gravel packing or hydraulic fracturing, disruptive shear thinning is undesirable because when the fluid is temporarily very thin it cannot suspend the gravel or proppant. Conventional shear thinning is acceptable provided that the fluid remains sufficiently viscous to transport the gravel or proppant. BET-E-40 fluids generally do not undergo disruptive shear thinning (although it cannot be ruled out for all formulations and if disruptive shear thinning is important, specific fluid formulations should be tested), and so would be particularly suitable for gravel packing or hydraulic fracturing. The fluids of embodiments of the present invention are particularly useful in gravel packing, where the high-density fluids carry the gravel to the bottom of the wellbore with a minimal amount of pumping (little hydraulic horsepower needed) because of the density difference between the gravel packing fluid and the fluid already in the wellbore.

For coiled tubing cleanout treatments, disruptive shear thinning is desirable because this makes it easier to create turbulence during the treatment and the turbulence aids the fluid in entraining the particles that the treatment is intended to remove from the well. It is beneficial in coiled tubing cleanouts to impart a slight delay in regaining full viscosity in order to more efficiently "jet" the solids from the bottom of the wellbore into the annulus. Once the particles are entrained and in the annulus, the regained viscosity of the fluid will ensure that the solids are effectively transported to the surface. Improving the viscosity-recovery and minimizing the time required for such recovery is therefore desirable. An agent that promotes disruptive shear thinning may be added, provided that it does not disrupt the structures giving rise to the surfactant gels in high density brines to the point where they no longer give sufficiently stable high viscosity gels at the temperatures at which they are needed. However, after the particles are entrained, higher viscosity helps the fluid to carry the particles to the surface, so it is desirable for the disruptive shear thinning to be temporary. (As with any additive, laboratory tests should be conducted to ensure compatibility of the disruptive shear thinning agent with the fluid, and to ensure that the disruptive shear thinning agent does not interfere with the performance of the fluid. Conducting such tests on any additive or additives is considered to be within the scope of the invention.)

Commonly, when viscous fluids are used in oilfield treatments or applications, there are sometimes situations in which it is desirable for the viscosity to decrease permanently after the fluids have served their purpose. Also, when surfactants are used in oilfield applications, there are sometimes situations in which it would be desirable for the surfactants no longer to be present after they have served their purpose. Often the time at which the viscosity or the surfactant are no longer desirable is a period of several hours after the treatment has ended. Consequently, an advantage in the use of the fluids and methods of embodiments of the present invention is that gels can be formed at temperatures at which the surfactants do not have long term thermal stability. As a result, the gels will eventually degrade at high temperatures without the need for either a) dilution by formation water or oil or condensate, or b) addition of a separate breaker or breaker precursor. The time at which this degradation occurs at a given temperature can be controlled by the choice of surfactant, surfactant concentration, other additives, and brine. Although not necessarily needed, it is within the scope of embodiments of the invention to employ additional breakers or breaker precursors, especially at lower temperatures, such as some of those described in U.S. Pat. No. 6,881,709, if desired. It should be noted that not all of the breakers and breaker precursors described in that application will be satisfactory for all of the surfactants described in the present application. Other breakers that may be used are described in U.S. Pat. No. 6,908,888.

In some cases, as with carbonate reservoirs, it may be advantageous to introduce additional treatment agents into the reservoir, such as acids, solvents, enzymes, and/or chelants. Useful acids include mineral acids and organic acids.

Figure 1:
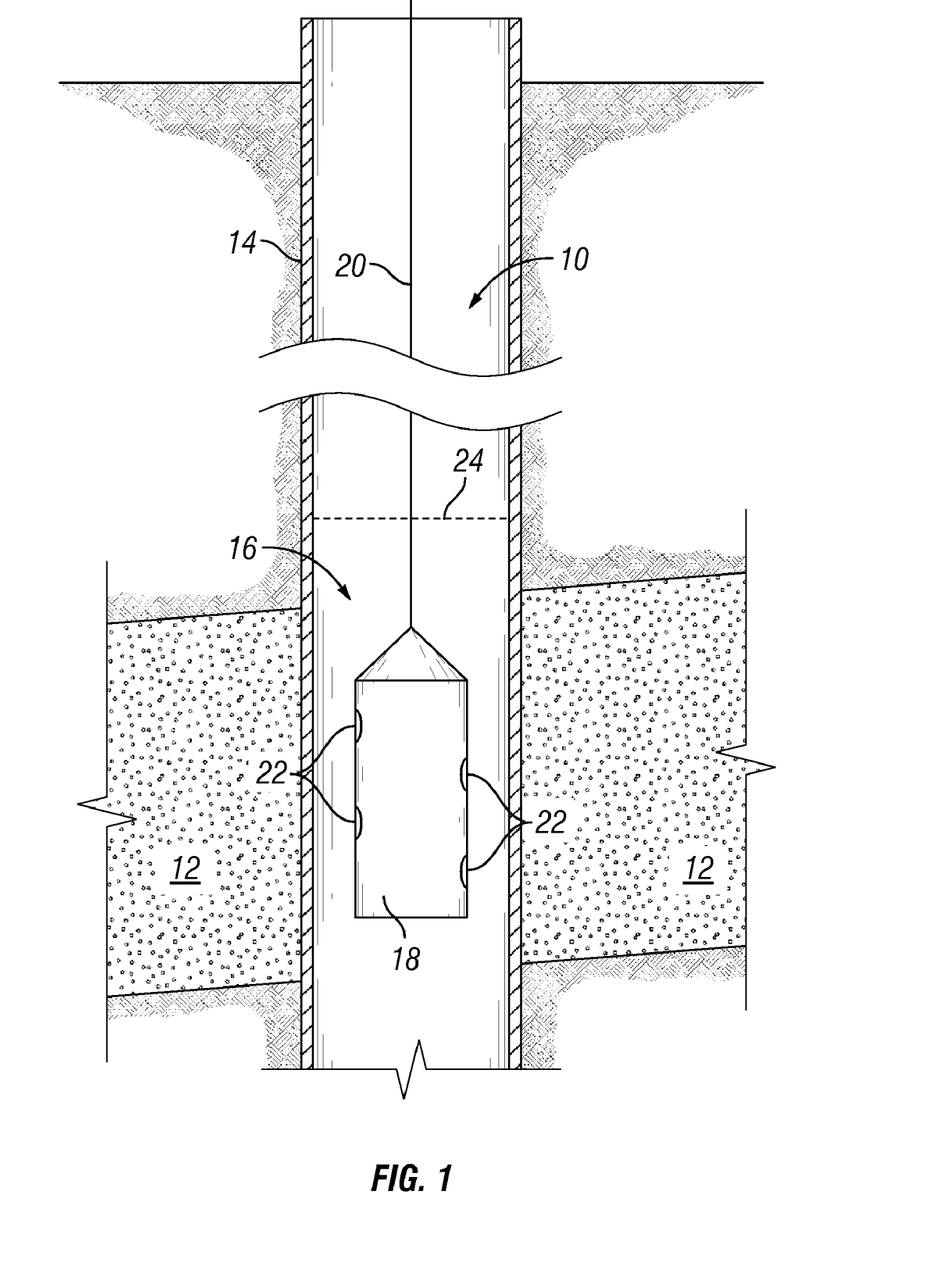
FIG. 1 is a schematic diagram of a perforating system useful in the present invention, prior to detonation of the perforating charges.

FIG. 1 shows a schematic of a perforating system in which the above-described perforating fluid can be used. A borehole 10 has been drilled from the surface down through subterranean formations 12 that contain hydrocarbon formation fluids, namely oil and/or gas. A generally cylindrical casing 14 lines the wall of the borehole, defining the wellbore 16. A perforating gun 18 has been lowered into the well on a wireline 20. The perforating gun includes at least one, and usually several explosive perforating charges 22. These charges are oriented such that when they are detonated, the force of the explosion will be primarily directed outward toward the casing (i.e., horizontally outward in FIG. 1). Detonation is triggered by a signal delivered through a control line from the surface (not shown in the figures).

The perforating fluid is located in the wellbore adjacent to the perforating gun 18. As depicted in FIG. 1, the wellbore has been filled with the perforating fluid to a depth sufficient to cover the perforating device (i.e., up to the level indicated by the dotted line 24). Thus, the perforating fluid is located between the perforating device and the casing, or more precisely, between the explosive perforating charges and the casing. There are a variety of ways that the perforating fluid can be placed in this position. For example, packers or other flow control devices could be used to define an enclosed space in the wellbore adjacent to the perforating gun, and then that defined space could be completely or partially filled with the perforating fluid.

Figure 2:
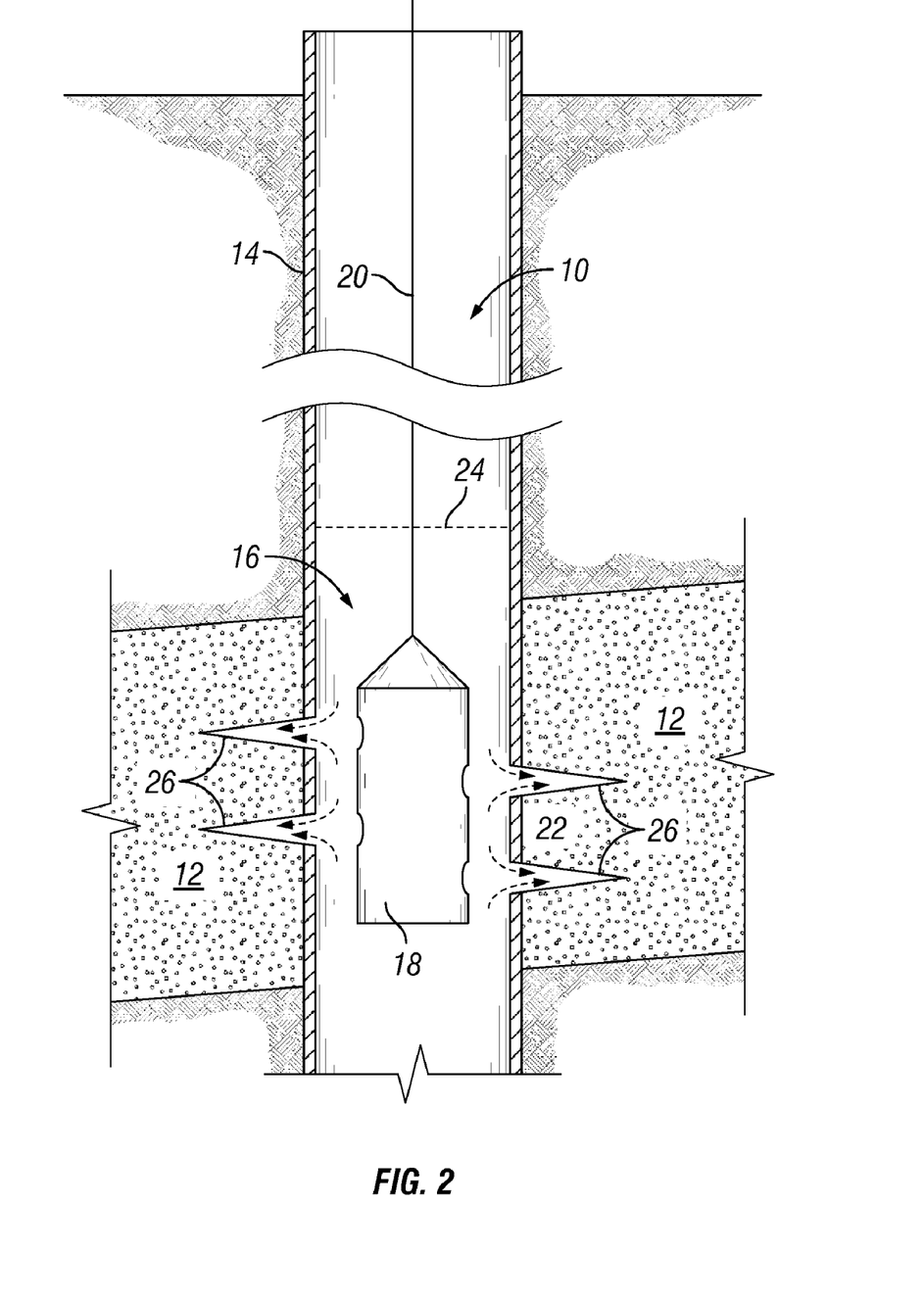
FIG. 2 is a schematic diagram of a perforating system useful in the present invention, after detonation of the perforating charges.

When the explosive perforating charges are detonated, perforations 26 are formed in the casing, as shown in FIG. 2. The force of the explosion also causes at least some of the adjacent perforating fluid to be forced out into the formation, as indicated by the arrows in FIG. 2.

It will usually be easier to place the perforating fluid in the wellbore between the perforating device and the casing prior to detonation. It would also be possible to provide the fluid at approximately the same time as the detonation or immediately after the detonation occurs.

Figure 3:
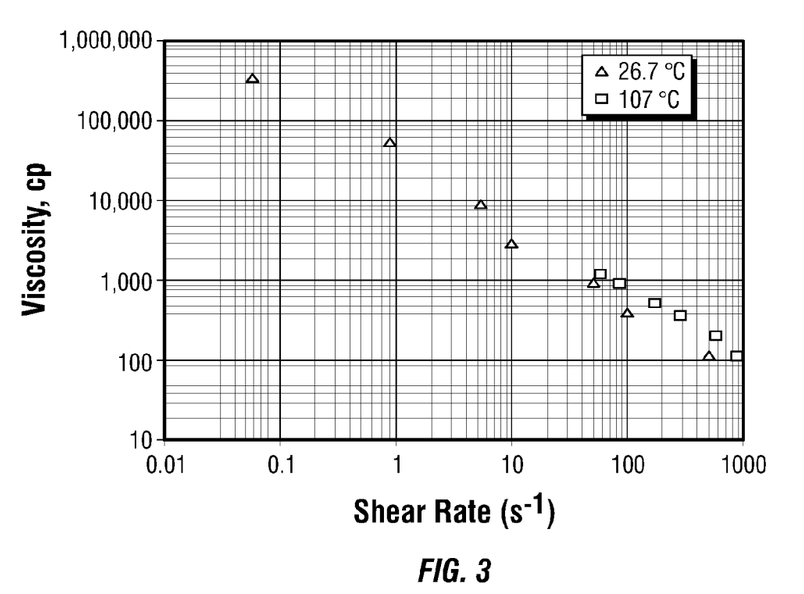
FIG. 3 is a graph of viscosity versus shear rate for a perforating fluid of the invention.

FIG. 3 shows the effect of shear on the viscosity of 15% (volume/volume) viscoelastic surfactant in 1.35 kg/L (11.3 ppg) $CaCl_2$ at 27° C. and 107° C. (80° and 225° F.). The viscosity of the fluid is extremely high at low shear rates, which helps to minimized fluid leak-off through the formation matrix.

Figure 4:
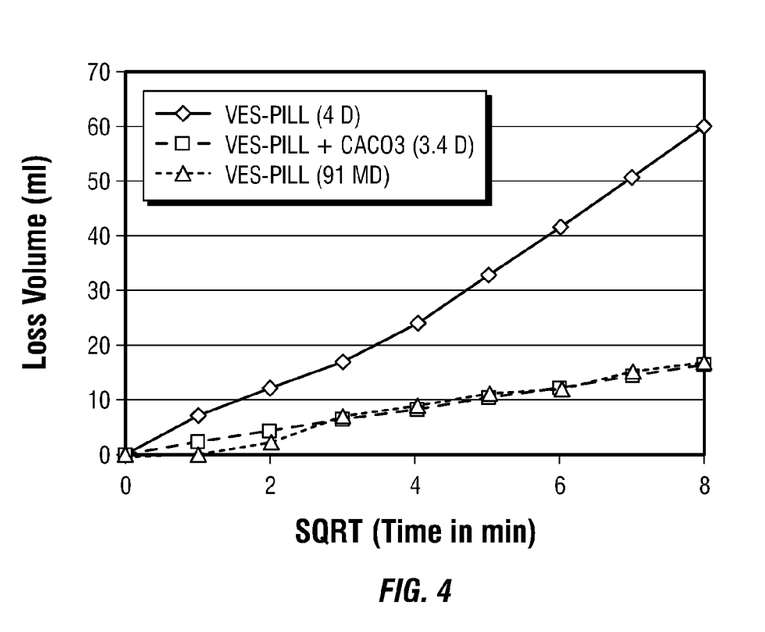
FIG. 4 is a graph of loss volume versus square root of time for a perforating fluid of the invention.

FIG. 4 shows fluid loss properties of a VES containing perforating fluid of the invention on different permeability cores. The experiments were conducted at 115° C. (240° F.) with an overbalance pressure of 345 kPa (50 psi). When using high permeability cores (4 D), the addition of particulate fluid-loss additive (65% coarse, 26% medium, 4% fine and 3% other fluid-loss materials; all concentrations are expressed in wt %) enhances the fluid-loss control of the VES to acceptable levels. Typically for 158 L (1 bbl) of VES fluid with $CaCO_3$ contains 119 L (0.75 bbl) of clean filtered brine, 8 L (0.05 bbl) methanol, 24 L (0.15 bbl) surfactant and 27.2 kg (60 lbs) of carbonate chips. The amount of various sized $CaCO_3$ particles used depends on particle size distribution of $CaCO_3$ used.

Figure 5:
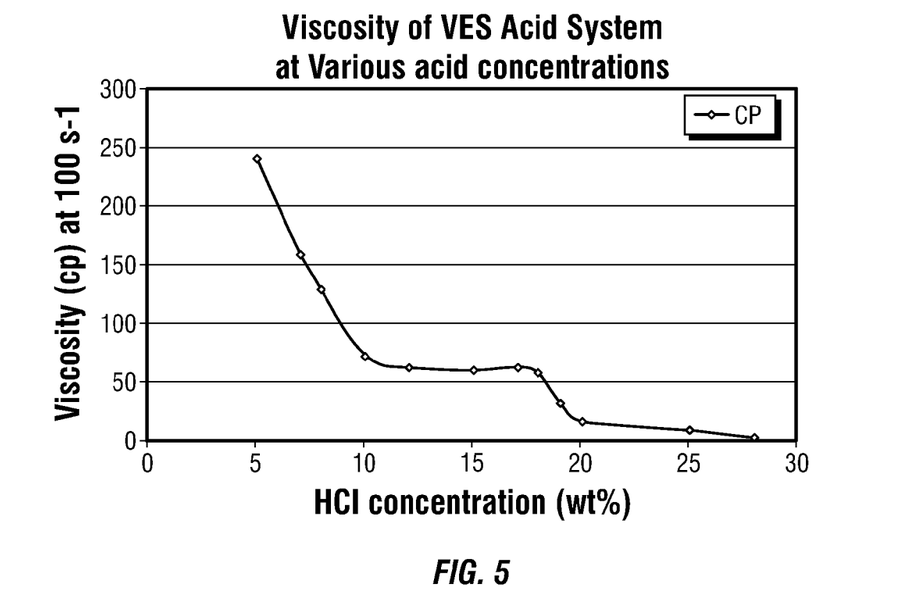
FIG. 5 is a graph of viscosity of a perforation fluid of the invention versus acid concentration.

FIG. 5 shows the viscosity of a VES perforating fluid. As can be seen, below an acid concentration of 10 wt % HCl, the fluid has very high viscosity.

Figure 6:
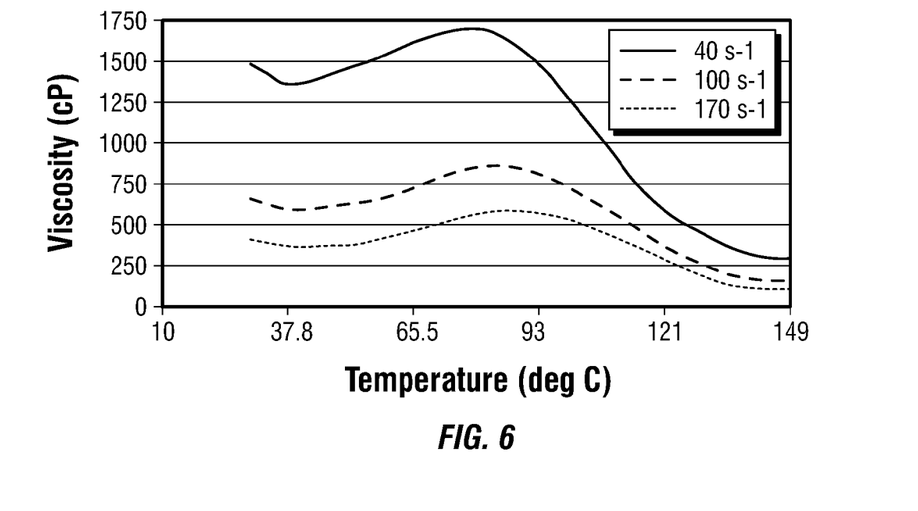
FIG. 6 is a graph of temperature versus viscosity for a perforation fluid of the invention.

FIG. 6 shows at various shear rates an oilbased perforating fluid containing a betaine surfactant 19 L (5 Gal), which has good low shear viscosity. This fluid can be used at least up to 149° C. (300° F.) This type of perforating fluid is useful for water sensitive formations where aqueous treatment fluids are not desirable.

The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for perforating a well made of a wellbore in a formation comprising the steps of:
   a. placing a perforating device comprising at least one explosive perforating charge in the wellbore;
   b. placing a perforating fluid comprising at least one viscoelastic surfactant in the wellbore between the perforating device and the formation;
   c. detonating the perforating device and allowing formation fluids to enter the wellbore;
   wherein as a result of the detonation, communication is established between the wellbore and the formation, and at least a portion of the perforating fluid is put in communication with the formation; and wherein the wellbore further contains in at least a portion thereof saline water or brine with a salt concentration above 0.96kg/L.

2. The method according to claim 1, wherein the wellbore further comprises a casing in at least a portion of the wellbore, and wherein the step of placing a perforating fluid comprising at least one viscoelastic surfactant in the wellbore is done between the perforating device and the casing at least for a portion of the wellbore; and the step of detonating the perforating device allows to perforate the casing.

3. The method according to claim 1, further comprising the step of:
allowing the perforating fluid to slowdown or stop fluid leak-off from the formation.

4. The method according to claim 1, further comprising the step of:
placing a reactive fluid such as acid or chelating agent or similar into the wellbore for stimulation of the formation.

5. The method according to claim 1, further comprising the step of:
killing the well.

6. The method according to claim 1, wherein the perforating fluid is placed into the wellbore prior to placement of the perforating device.

7. The method according to claim 1, wherein the perforating fluid is placed into the wellbore after placement of the perforating device.

8. The method according to claim 1, wherein the well is overbalanced.

9. The method according to claim 1, wherein the wellbore further contains in at least a portion thereof brine with weight concentration of salt equal or above 12.5kg/L.

10. The method according to claim 1, wherein the wellbore further contains in at least a portion thereof temperature equal or above 60degC.

11. The method according to claim 10, wherein the wellbore further contains in at least a portion thereof temperature equal or above 100degC.

12. The method according to claim 1, further comprising the step of an additional treatment selected from the group consisting of: scale treatment, water jetting treatment, perforating treatment according to claim 1 and a combination thereof.

* * * * *